United States Patent
McKenney

(10) Patent No.: US 9,256,476 B2
(45) Date of Patent: *Feb. 9, 2016

(54) EXPEDITED MODULE UNLOADING FOR KERNEL MODULES THAT EXECUTE READ-COPY UPDATE CALLBACK PROCESSING CODE

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 486 days.

This patent is subject to a terminal disclaimer.

(21) Appl. No.: 13/316,476

(22) Filed: Dec. 10, 2011

(65) Prior Publication Data

US 2013/0152095 A1 Jun. 13, 2013

(51) Int. Cl.
- *G06F 9/46* (2006.01)
- *G06F 7/00* (2006.01)
- *G06F 9/52* (2006.01)

(52) U.S. Cl.
CPC .......... *G06F 9/522* (2013.01); *G06F 2209/521* (2013.01)

(58) Field of Classification Search
CPC .... G06F 9/522; G06F 9/526; G06F 17/30578
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 3/1997 | Slingwine et al. | |
| 5,727,209 A * | 3/1998 | Slingwine et al. | 718/102 |
| 6,219,690 B1 | 4/2001 | Slingwine et al. | |
| 6,662,184 B1 | 12/2003 | Friedberg | |
| 6,886,162 B1 | 4/2005 | McKenney | |
| 6,996,812 B2 | 2/2006 | McKenney | |
| 7,191,272 B2 | 3/2007 | McKenney | |
| 7,287,135 B2 | 10/2007 | McKenney et al. | |
| 7,349,926 B2 | 3/2008 | McKenney et al. | |
| 7,353,346 B2 | 4/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |
| 7,454,581 B2 | 11/2008 | McKenney et al. | |
| 7,472,228 B2 * | 12/2008 | McKenney et al. | 711/141 |
| 7,653,791 B2 | 1/2010 | McKenney | |
| 7,668,851 B2 | 2/2010 | Triplett | |
| 7,689,789 B2 | 3/2010 | McKenney et al. | |
| 7,734,879 B2 * | 6/2010 | McKenney et al. | 711/151 |
| 7,734,881 B2 | 6/2010 | McKenney et al. | |

(Continued)

OTHER PUBLICATIONS

J. Seigh, "RCU + SMR for preemptive kernel/user threads," Linux Kernel Mailing List, May 9, 2005, 2 pages.

(Continued)

*Primary Examiner* — Wissam Rashid
(74) *Attorney, Agent, or Firm* — Walter W. Duft

(57) ABSTRACT

A technique for expediting the unloading of an operating system kernel module that executes read-copy update (RCU) callback processing code in a computing system having one or more processors. According to embodiments of the disclosed technique, an RCU callback is enqueued so that it can be processed by the kernel module's callback processing code following completion of a grace period in which each of the one or more processors has passed through a quiescent state. An expediting operation is performed to expedite processing of the RCU callback. The RCU callback is then processed and the kernel module is unloaded.

4 Claims, 11 Drawing Sheets

(56) References Cited

U.S. PATENT DOCUMENTS

| | | | |
|---|---|---|---|
| 7,747,805 | B2 | 6/2010 | McKenney |
| 7,814,082 | B2 | 10/2010 | McKenney |
| 7,818,306 | B2 | 10/2010 | McKenney et al. |
| 7,873,612 | B2 | 1/2011 | McKenney et al. |
| 7,904,436 | B2 | 3/2011 | McKenney |
| 7,934,062 | B2 | 4/2011 | McKenney et al. |
| 7,953,708 | B2 | 5/2011 | McKenney et al. |
| 7,953,778 | B2 | 5/2011 | McKenney et al. |
| 7,987,166 | B2 | 7/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 * | 1/2012 | Triplett .................... 713/300 |
| 2006/0112121 | A1 | 5/2006 | McKenney et al. |
| 2006/0117072 | A1 | 6/2006 | McKenney |
| 2006/0130061 | A1 | 6/2006 | Bauer et al. |
| 2006/0265373 | A1 | 11/2006 | McKenney et al. |
| 2008/0082532 | A1 | 4/2008 | McKenney |
| 2008/0313238 | A1 | 12/2008 | McKenney et al. |
| 2009/0006403 | A1 | 1/2009 | McKenney |
| 2009/0077080 | A1 | 3/2009 | McKenney |
| 2009/0320030 | A1 | 12/2009 | Ogasawara |
| 2010/0023559 | A1 * | 1/2010 | McKenney et al. ........... 707/201 |
| 2010/0023732 | A1 | 1/2010 | Triplett |
| 2010/0115235 | A1 | 5/2010 | Triplett |
| 2011/0055183 | A1 | 3/2011 | McKenney |
| 2011/0283082 | A1 | 11/2011 | McKenney et al. |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.
P. McKenney et al., "Scaling dcache with RCU," Linux Journal, Jan. 1, 2004, 12 pages.
P. McKenney et al., "Using RCU in the Linux 2.5 Kernel," Linux Journal, Oct. 1, 2003, 11 pages.
P. McKenney et al.,"Read-Copy Update," 2002 Ottawa Linux Symposium, Jul. 8, 2002, 32 pages.
H. Lindar et al., "Scalability of the Directory Entry Cache," 2002 Ottawa Linux Symposium, Jun. 26, 2002, pp. 289-300.
P. McKenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.

McKenney, "Seven real-time Linux approaches (Part C)", LinuxDevices.com, Jun. 7, 2005, 13 pages.
P. McKenney, "RCU and CONFIG_PREEMPT_RT progress," Linux Kernel Mailing List, May 9, 2005, 2 pages.
O. Nesterov, QRCU: 'Quick' SRCU Implementation, Linux Kernel Mailing List, Dec. 1, 2005, 3 pages.
P. McKenney, "Sleepable RCU", LWN.net, Oct. 9, 2006, 10 pages.
P. McKenney, "Read-Copy Update Implementations", 2001, 3 pages.
M. Herlihy, "A Methodology for Implementing Highly Concurrent Data Objects," ACM Transactions on Programming Languages and Systems, vol. 15, Issue 5, Nov. 1993, pp. 745-770.
M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.
N. Barghouti et al., "Concurrency Control in Advanced Database Operations," Jan. 1994, 83 pages.
P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.
P. McKenney et al., "Extending RCU for Realtime and Embedded Workloads," 2006 Ottawa Linux Symposium, Aug. 11, 2006, 15 pages.
P. McKenney, "The design of preemptible read-copy-update," LWN. net, Oct. 8, 2007, 27 pages.
P. McKenney, "Integrating and Validating dynticks and Preemptible RCU," LWN.net, Apr. 22, 2008, 19 pages.
P. McKenney, "Hierarchical RCU," LWN.net, Nov. 4, 2008, 19 pages.
P. McKenney, "Is Parallel Programming Hard, and, If So, What Can You Do About It", Mar. 8, 2009, 146 pages.
P. McKenney, "Priority-Boosting RCU Read-Side Critical Sections," LWN.net, Feb. 5, 2007, 15 pages.
P. McKenney et al., "Towards hard realtime response from the Linux kernel on SMP hardware," linux.conf.au, Canberra, Australia, Apr. 2005, 16 pages.
P. McKenney et al., "Exploiting Deferred Destruction: An Analysis of Read-Copy-Update Techniques in Operating System Kernels", Jan. 3, 2005, pp. 1-41.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Simplicity Through Optimization", linux.conf.au, Jan. 2010, 109 pages.
P. McKenney, "Deterministic Synchronization in Multicore Systems: the Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" RCU grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.
P. McKenney, "Using a Malicious User-Level RCU to Torture RCU-Based Algorithms", linux.conf.au, Jan. 2009, 51 pages.
P. McKenney et al., "Introducing Technology Into the Linux Kernel: A Case Study", Operating Systems Review, Jul. 2008, 16 pages.
P. McKenney, "What is RCU, Fundamentally", LWN.net, Dec. 17, 2007, 15 pages.
P. McKenney, What is RCU? Part 2: Usage, LWN.net, Dec. 24, 2007, 15 pages.
P. McKenney, RCU part 3: the RCU API, LWN.net, Jan. 7, 2008, 7 pages.
T. Hart et al., "Performance of memory reclamation for lockless synchronization", Journal of Parallel and Distributed Computing, Dec. 2007, pp. 1270-1285.
McKenney, "Using Promela and Spin to verify parallel algorithms", LWN.net, Aug. 1, 2007, 11 pages.

(56) References Cited

OTHER PUBLICATIONS

McKenney, "RCU and Unloadable Modules", LWN.net, Jan. 14, 2007, 4 pages.
P. Zijlstra, "[PATCH] slab: document SLAB_DESTROY_BY_RCU", LKML.org, Nov. 13, 2008, 1 page.
A. Arcangeli et al., "Using Read-Copy-Update Techniques for System V IPC in the Linux 2.5 Kernel," 2003 Freenix, Jun. 14, 2003, 13 pages.
P. McKenney, "The RCU API, 2010 Edition", LWN.net, Dec. 8, 2010, 11 pages.
M. Desnoyers et al., "User-Level Implementations of Read-Copy Update", IEEE Transactions on Parallel and Distributed Systems, vol. x, No. y, Jul. 2009, pp. 1-14.
IBM et al., "RCU and Sometimes Read Mostly Data Structures", IPCOM000176300D, Nov. 11, 2008.
P. McKenney, "RCU and Unloadable Modules", LWN.net, Jan. 14, 2007, 5 pages.
D. Sarma et al., "Linux/kernel/rcupdate.c", Jan. 2001, 5 pages.
P. McKenney, "Linux/kernel/rcutiny.c", Jan. 2008, 6 pages.
P. McKenney, "Linux/include/linux/rcutiny.h", Jan. 2008, 3 pages.
P. McKenney, Linux/kernel/rcutiny_plugin.h, Jan. 2010, 16 pages.
D. Sarma et al., "Linux/kernel/rcutree.c", Jan. 2008, 34 pages.
I. Molnar et al., "Linux/kernel/rcutree.h", Jan. 2008, 8 pages.
I. Molnar et al., "Linux/kernel/rcutree_plugin.h", Jan. 2009, 29 pages.

\* cited by examiner

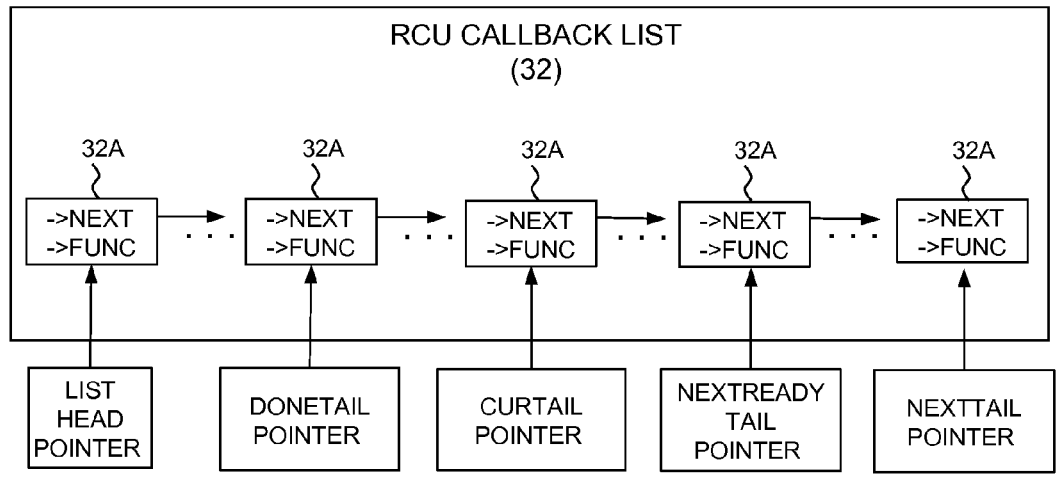
FIG. 7
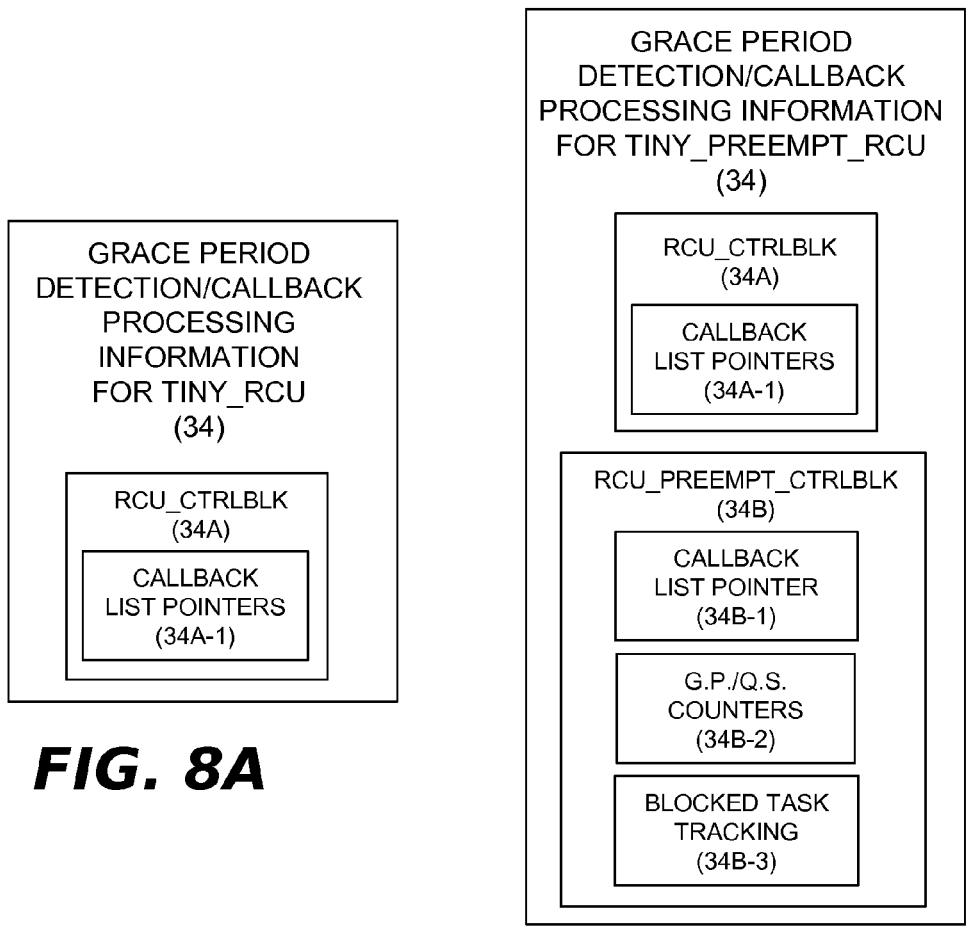
FIG. 8A
FIG. 8B

EXPEDITED MODULE UNLOADING FOR KERNEL MODULES THAT EXECUTE READ-COPY UPDATE CALLBACK PROCESSING CODE

BACKGROUND

1. Field

The present disclosure relates to computer systems and methods in which data resources are shared among data consumers while preserving data integrity and consistency relative to each consumer. More particularly, the disclosure concerns an implementation of a mutual exclusion mechanism known as "read-copy update" in a computing environment wherein loadable modules contain code that is used to process read-copy update callbacks.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch. In preemptible operating system kernels, additional steps are needed to account for readers that were preempted within their RCU read-side critical sections. In current RCU implementations designed for the Linux® kernel, a blocked reader task list is maintained to track such readers. A grace period will only end when the blocked task list indicates that is safe to do so because all blocked readers associated with the grace period have exited their RCU read-side critical sections. Other techniques for tracking blocked readers may also be used, but tend to require more read-side overhead than the current blocked task list method.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may be synchronous or asynchronous. According to the synchronous technique, an updater performs the first phase update operation, invokes an RCU primitive such as synchronize_rcu( ) to advise when all current RCU readers have completed their RCU critical sections and the grace period has ended, blocks (waits) until the grace period has completed, and then implements the second phase update operation, such as by removing stale data. According to the asynchronous technique, an updater performs the first phase update operation, specifies the second phase update operation as a callback using an RCU primitive such as call_rcu( ), then resumes other processing with the knowledge that the callback will eventually be processed at the end of a grace period. Advantageously, callbacks requested by one or more updaters can be batched (e.g., on callback lists) and processed as a group at the end of an asynchronous grace period. This allows the grace period overhead to be amortized over plural deferred update operations.

Modern operating systems, including current versions of the Linux® kernel, use loadable modules to implement device drivers, file systems and other software. Loadable modules allow software functionality to be installed on an as-needed basis and then removed when the software is no longer required. This reduces the memory footprint of the base kernel. In operating systems that implement read-copy update with asynchronous grace period detection, some or all of the callback function code that processes a callback following the end of a grace period may be located within a loadable module. If the module containing the callback function code is unloaded before a pending callback that requires such code can be invoked, problems will arise when an attempt is made to implement the callback function because its code is no longer part of the running kernel.

A response to this scenario was the development of the "rcu_barrier( )" primitive, which can be called by a module's exit code during module unloading. The rcu_barrier( ) primitive waits for the end of the current grace period and for all RCU callbacks associated with the grace period to be invoked. When using the rcu_barrier( ) primitive, the sequence of operations performed by a kernel module's exit code is to (1) prevent any new RCU callbacks from being posted, (2) execute rcu_barrier( ), and (3) allow the module to be unloaded. The rcu_barrier( ) primitive is for use by process context code. For the non-preemptible uniprocessor version of RCU known as TINY_RCU, the rcu_barrier( ) primitive is set forth at lines 41-44 of the Linux® version 3.1 source code file named Linux/include/linux/rcutiny.h. This primitive is a wrapper function for a helper function called "rcu_barrier_sched( ), which is set forth at lines 298-309 of the Linux® version 3.1 source code file named Linux/kernel/rcutiny.c. For the preemptible uniprocessor version of RCU known as TINY_PREEMPTIBLE_RCU, the rcu_barrier( ) primitive is set forth at lines 700-711 of the Linux® version 3.1 source code file named Linux/kernel/rcutiny_plugin.h. For the hierarchical multiprocessor versions of RCU known as TREE_RCU and TREE_PREEMPTIBLE_RCU, the rcu_barrier( ) primitive is set forth at lines 854-857 of the Linux® version 3.1 source code file named Linux/kernel/rcutree_plugin.h. This is a wrapper function that calls a helper function named rcu_barrier( ), which may be found at lines 1778-1807 of the Linux® version 3.1 source code file named Linux/kernel/rcutree.c.

In many instances, it is desirable to expedite module unloading so that the module's kernel memory can be reclaimed for other uses. Unfortunately, the rcu_barrier( ) primitive can delay module unloading due to the latency associated with waiting for the end of a current RCU grace period and for all prior RCU callbacks to be invoked. The present disclosure presents a technique for improving this situation by speeding up RCU grace period detection and callback processing operations during module unloading.

SUMMARY

A method, system and computer program product are provided for expediting the unloading of an operating system kernel module that executes read-copy update (RCU) callback processing code in a computing system having one or more processors. According to embodiments of the disclosed technique, an RCU callback is enqueued so that it can be processed by the kernel module's callback processing code following completion of a grace period in which each of the one or more processors has passed through a quiescent state. An expediting operation is performed to expedite processing of the RCU callback. The RCU callback is then processed and the kernel module is unloaded.

In an example embodiment, the computing system is a uniprocessor system that runs a non-preemptible operating system kernel, and the callback processing code runs in a deferred non-process context of the operating system kernel. In that case, the expediting operation may comprise invoking the deferred non-process context to force the callback processing code to execute.

In another example embodiment, the computing system is a uniprocessor system that runs a preemptible operating system kernel. In that case, the expediting operation may comprise implementing a priority boost for blocked reader tasks that are preventing completion of the grace period.

In another example embodiment, the computing system is a multiprocessor system that runs a non-preemptible operating system kernel. In that case, the expediting operation may comprise forcing each processor to note a new grace period and forcing a quiescent state on each processor, such as by implementing a rescheduling operation on each processor. The expediting operation may be repeated as necessary until the RCU callback is processed.

In another example embodiment, the computing system is a multiprocessor system that runs a preemptible operating system kernel. In that case, the expediting operation may comprise forcing each processor to note a new grace period and forcing a quiescent state on each processor by implementing a priority boost for blocked reader tasks that are preventing completion of the grace period. The expediting operation may be repeated as necessary until the RCU callback is processed.

BRIEF DESCRIPTION OF THE DRAWINGS

The foregoing and other features and advantages will be apparent from the following more particular description of example embodiments, as illustrated in the accompanying Drawings, in which:

FIG. 7 is a functional block diagram showing an example callback list and its associated list pointers for accessing different portions of the list;

FIG. 8A is a functional block diagram showing an example of grace period detection and callback processing information that may be maintained for a TINY_RCU implementation of the RCU subsystem of FIG. 6;

FIG. 8B is a functional block diagram showing an example of grace period detection and callback processing information that may be maintained for a TINY_PREEMPT_RCU implementation of the RCU subsystem of FIG. 6;

DETAILED DESCRIPTION OF EXAMPLE EMBODIMENTS

Figure 4:
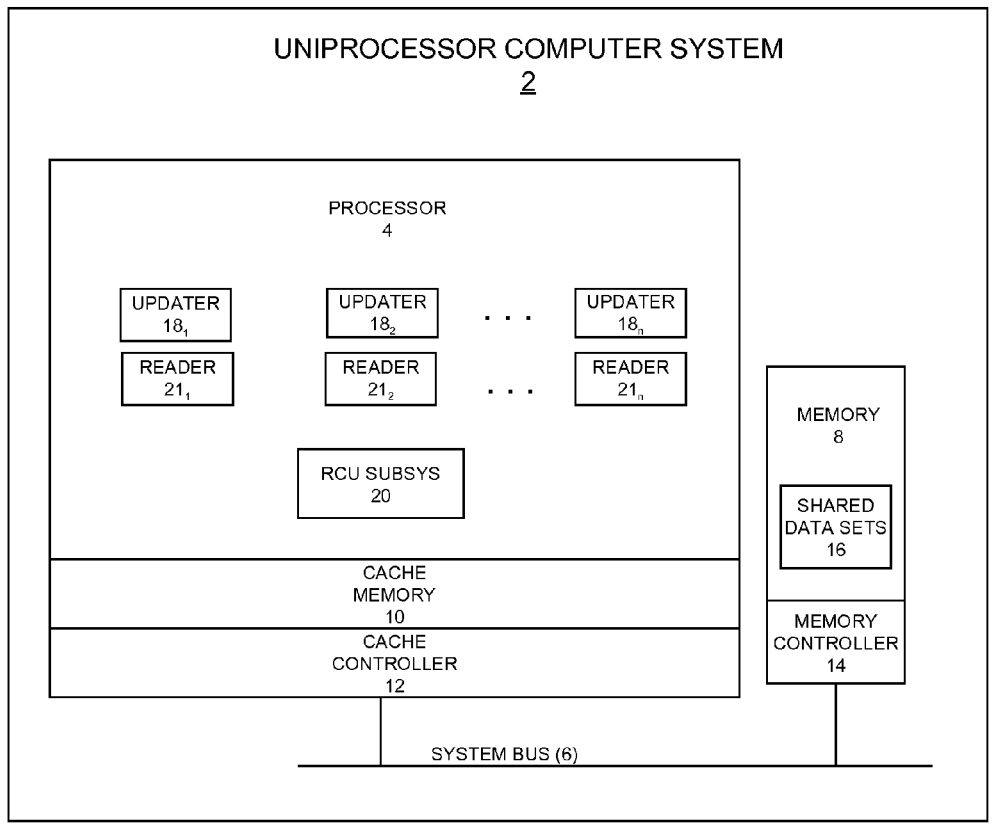
FIG. 4 is a functional block diagram showing a uniprocessor computing system that may be implemented in accordance with the present disclosure.
Figure 5:
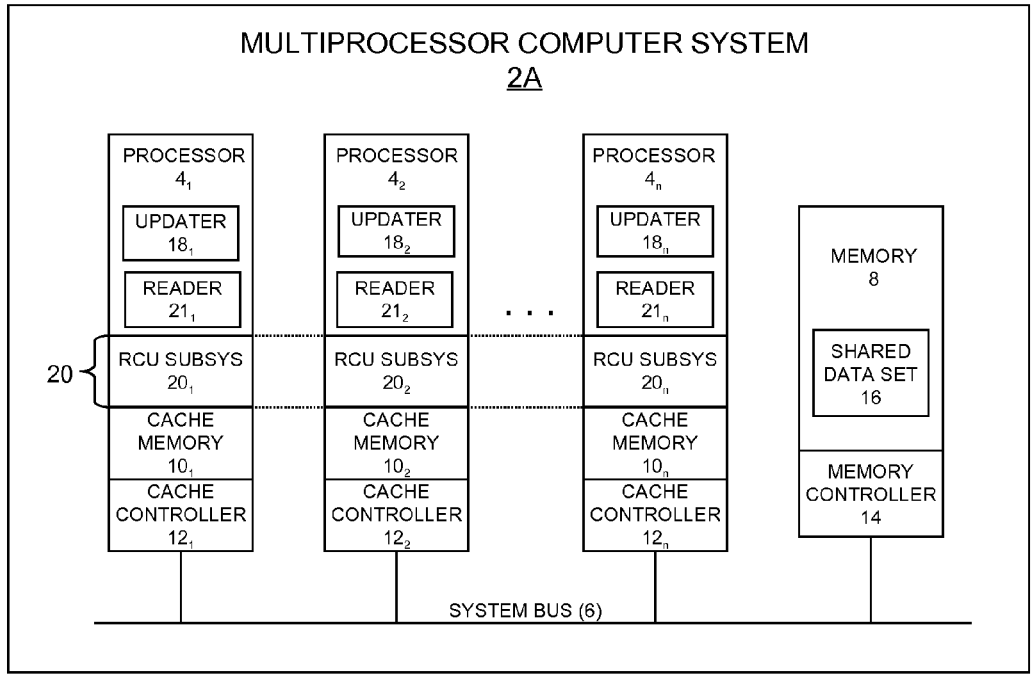
FIG. 5 is a functional block diagram showing a multiprocessor computing system that may be implemented in accordance with the present disclosure.

Turning now to the figures, wherein like reference numerals represent like elements in all of the several views, FIGS. 4 and 5 respectively illustrate example uniprocessor and multiprocessor computing environments in which the expedited module unloading technique disclosed herein may be implemented. In FIG. 4, a uniprocessor computing system 2 includes a single processor 4, a system bus 6 (or other interconnection pathway) and a program memory 8. A conventional cache memory 10 and a cache controller 12 are associated with the processor 4. A conventional memory controller 14 is associated with the memory 8. As shown, the memory controller 14 may reside separately from processor 4 (e.g., as part of a chipset). Alternatively, the memory controller 14 could be integrated with the processor 4 (as is known in the art). In FIG. 5, a multiprocessor computing system 2A includes multiple processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A conventional memory controller 14 is again associated with the memory 8. As shown, the memory controller 14 may reside separately from processors $4_2 \ldots 4_n$ (e.g., as part of a chipset). Alternatively, the memory controller 14 could be provided by plural memory controller instances respectively integrated with the processors $4_2 \ldots 4_n$ (as is known in the art).

In each of FIGS. 4 and 5, the example computing systems 2 and 2A may represent any of several different types of computing apparatus. Such computing apparatus may include, but are not limited to, general purpose computers, special purpose computers, portable computing devices, communication and/or media player devices, set-top devices, embedded systems, to name but a few. In FIG. 4, the processor 4 may be implemented as a single-core CPU (Central Processing Unit) device. In FIG. 5, the processors $4_1, 4_2 \ldots 4_n$ may each be a single-core CPU device. Alternatively, the processors $4_1, 4_2 \ldots 4_n$ could represent individual cores within a multi-core CPU device. Each CPU device embodied by any given processor 4 of FIGS. 4 and 5 is operable to execute program instruction logic under the control of a software program stored in the memory 8 (or elsewhere). The memory 8 may comprise any type of tangible storage medium capable of storing data in computer readable form, including but not limited to, any of various types of random access memory (RAM), various flavors of programmable read-only memory (PROM) (such as flash memory), and other types of primary storage. In FIG. 4, the processors 4 and the memory 8 may be situated within a single computing device or node. In FIG. 5, the processors $4_1, 4_2 \ldots 4_n$ may be situated within a single computing device or node (e.g., as part of a single-node SMP system) or they may be distributed over plural nodes (e.g., as part of a NUMA system, a cluster, a cloud, etc.).

An update operation (updater) 18 may periodically execute within a process, thread, or other execution context (hereinafter "task") on any processor 4 of FIGS. 4 and 5. Each updater 18 runs from program instructions stored in the memory 8 (or elsewhere) in order to periodically perform updates on a set of shared data 16 that may be stored in the shared memory 8 (or elsewhere). FIG. 4 illustrates a single updater 18 executing on the lone processor 4. In FIG. 5, reference numerals $18_1, 18_2 \ldots 18_n$ illustrate individual data updaters that may periodically execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 of FIGS. 4 and 5 are programmed from instructions stored in the memory 8 (or elsewhere) to implement a read-copy update (RCU) subsystem 20 as part of their processor functions. FIG.

4 illustrates a single RCU subsystem executing on the lone processor 4. In FIG. 5, reference numbers $20_1, 20_2 \ldots 20_n$ represent individual RCU instances that may periodically execute on the several processors $4_1, 4_2 \ldots 4_n$. Any given processor 4 in FIGS. 4 and 5 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). FIG. 4 illustrates a single reader 21 executing on the lone processor 4. In FIG. 5, reference numerals $21_1, 21_2 \ldots 21_n$ illustrate individual reader instances that may periodically execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element. Embodiments of the updaters 18 and the readers 21 may be preemptible, and embodiments of the systems 2 and 2A may, for example, support real-time operations.

During run time, an updater 18 will occasionally perform an update to one of the shared data elements 16. In accordance the philosophy of RCU, a first-phase update is performed in a manner that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view following a grace period (second-phase update). As described in the "Background" section above, this is known as asynchronous grace period processing.

The RCU subsystem 20 may handle both asynchronous and synchronous grace periods. Each type of grace period processing entails starting new grace periods and detecting the end of old grace periods so that the RCU subsystem 20 knows when it is safe to free stale data (or take other actions). Asynchronous grace period processing further entails the management of callback lists that accumulate callbacks until they are ripe for batch processing at the end of a given grace period. As part of this batch processing, it is assumed for purposes of the present disclosure that at least some of the code that processes RCU callbacks is implemented by a loadable operating system kernel module. It will be appreciated that the kernel module should not be unloaded unless and until it has no further callback processing work remaining to be done.

Grace period processing operations may be performed by periodically running the RCU subsystem 20 on the lone processor 4 in FIG. 4 or on each of the several processors $4_1, 4_2 \ldots 4_n$ in FIG. 5. As is known, different aspects of such processing may be variously invoked by an operating system scheduler and an scheduling clock interrupt handler, and run in a combination of process context and bottom half context or kernel thread context.

In current versions of the Linux® kernel, there are four main variants of RCU designed for different processor and operating system configurations. Two uniprocessor variants called TINY_RCU and TINY_PREEMPT_RCU may be used with the uniprocessor system 2 of FIG. 4. TINY_RCU is for non-preemptible kernels and TINY_PREEMPT_RCU is for preemptible kernels. Two multiprocessor variants called TREE_RCU and TREE_PREEMPT_RCU may be used with the multiprocessor system 2A of FIG. 5. TREE_RCU is for non-preemptible kernels and TREE_PREEMPT_RCU is for preemptible kernels. Each of the above-listed RCU variants may be used as a starting point for implementing embodiments of the subject matter disclosed herein. Table 1 below lists the salient Linux 3.1 source code files for these RCU variants. Persons of ordinary skill in the art to whom the present disclosure is directed will be familiar with such Linux-based RCU implementations. It should be understood, however, that other RCU implementations may also be used in lieu of the four Linux-specific RCU variants mentioned above.

TABLE 1

| RCU VARIANT | LINUX ® 3.1 SOURCE CODE FILES |
| --- | --- |
| TINY_RCU/TINY_PREEMPT_RCU | Linux/kernel/rcutiny.c |
|  | Linux/include/linux/rcutiny.h |
|  | Linux/kernel/rcutiny_plugin.h |
| TREE_RCU/TREE_PREEMPT_RCU | Linux/kernel/rcutree.c |
|  | Linux/kernel/rcutree.h |
|  | Linux/kernel/rcutree_plugin.h |

Figure 6:
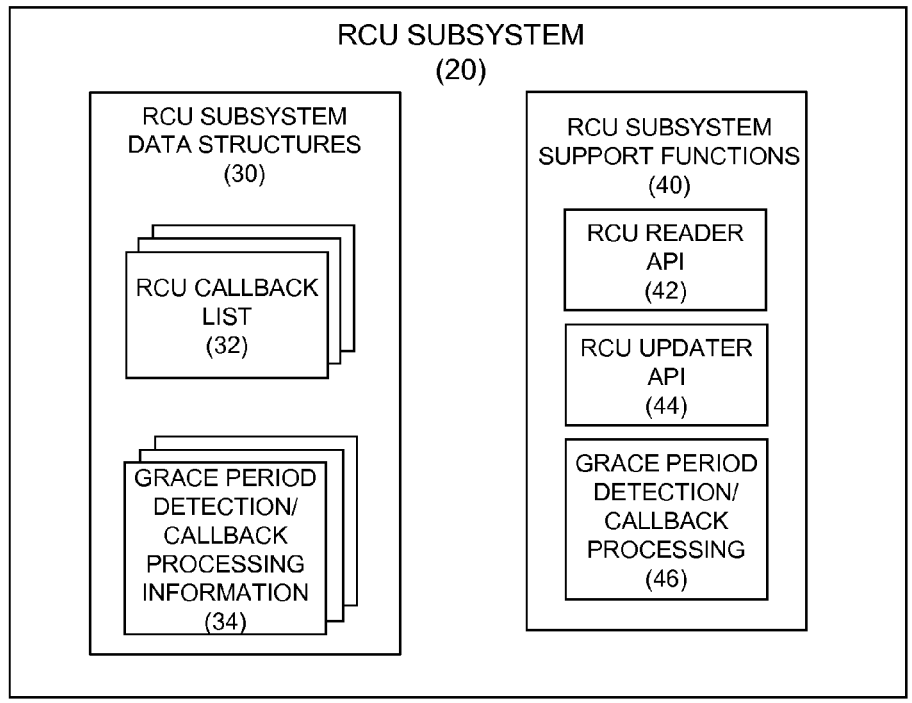
FIG. 6 is a functional block diagram showing an example RCU subsystem that may be provided in the computer systems of FIGS. 4 and 5.

FIG. 6 illustrates components of the RCU subsystem 20 that are variously present in the above-identified RCU variants. Among these components are several RCU subsystem data structures 30, including one or more RCU callback lists 32 and one or more data structures comprising grace period detection and callback processing information 34. The RCU callback lists 32 are provided on a per-processor basis, such that TINY_RCU and TINY_PREEMPT_RCU implementations have a single callback list and TREE_RCU and TREE_PREEMPT_RCU implementations have as many callback lists as there are processors. As is conventionally known, each callback list accumulates RCU callbacks for batch processing at the end of grace periods, with each list typically comprising several list portions that respectively accumulate callbacks for a given grace period. Further details of the callback lists 32 are described in more detail below in connection with FIG. 7. The grace period/callback processing information 34 is used to track grace periods and quiescent states and/or to manipulate the callback lists 32. In the TINY_PREEMPT_RCU and TREE_PREEMPT_RCU implementations, the grace period/callback information 34 also tracks blocked readers that may be affecting grace period progress. Further details of these data structures are described in more detail below in connection with FIGS. 8A-8C.

With continuing reference to FIG. 6, additional components of the RCU subsystem 20 that are variously present in the above-referenced RCU variants include several RCU subsystem support functions 40, namely, an RCU reader API (Application Programming Interface) 42, an RCU updater API 44, and various grace period detection and callback processing functions 46. Further details of the support functions 40 are described in more detail below in connection with FIG. 9.

Turning now to FIG. 7, an example embodiment of an RCU callback list 32 comprises a linked list of RCU callbacks 32A. In all of the above-referenced RCU variants, each processor maintains its own callback list 32. Although FIG. 7 shows five RCU callbacks 32A on the callback list 32, this is for purposes of illustration only. As is conventionally known, each RCU callback 32A may comprise an rcu_head pointer (→next) to the next RCU callback on the callback list 32, and a pointer (→func) to a callback processing function. In an example embodiment, each RCU callback 32A may be coded in software as an rcu_head structure using the following C programming declaration:

```
struct rcu_head {
    struct rcu_head *next;
    void (*func)(struct rcu_head *head);
};
```

Figure 8C:
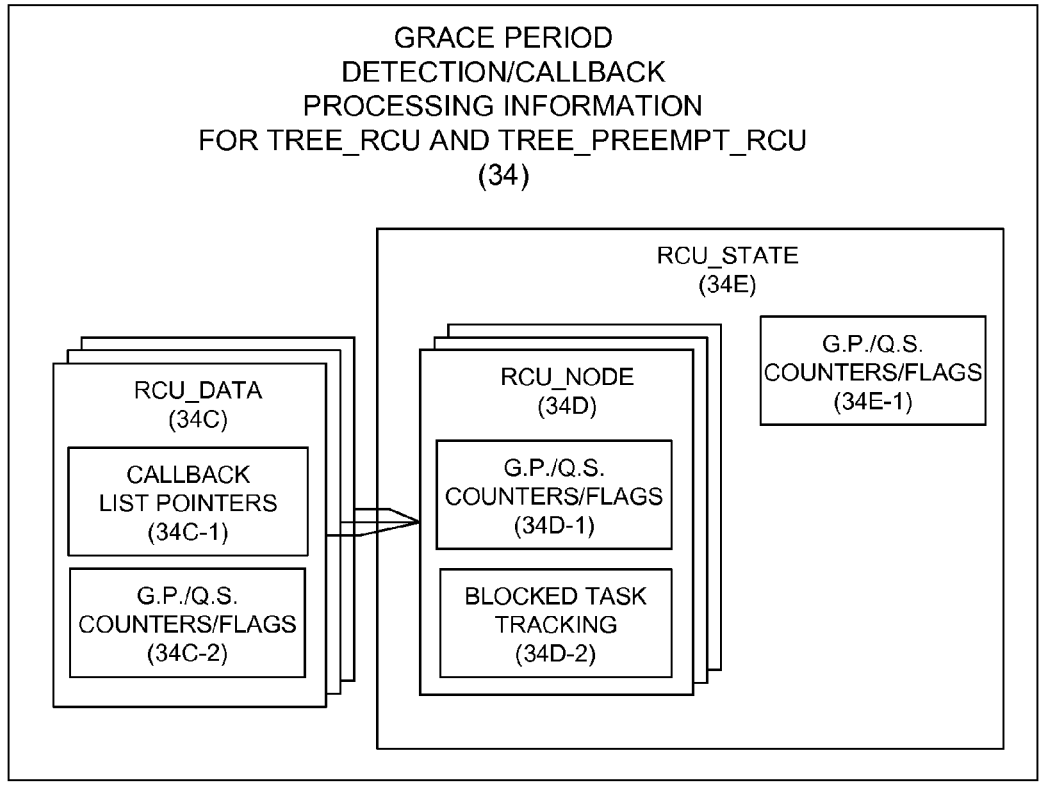
FIG. 8C is a functional block diagram showing an example of grace period detection and callback processing information that may be maintained for TREE_RCU and TREE_PREEMPT_RCU implementations of the RCU subsystem of FIG. 6.

Each processor's RCU callback list 32A is accessed using list pointers that are maintained as part of the grace period/callback processing information 34 (See FIGS. 8A-8C). A list head pointer points to the head of the RCU callback list 32. Several list portion tail pointers are used to partition the callback list 32 into list portions that are used to accumulate callbacks during different grace periods. Each list portion tail pointer references the → next pointer of the last RCU callback 32A of a particular list portion. The number of callback list portions varies by RCU implementation. The TINY_RCU variant maintains two list portions, known as the "donelist" and the "curlist." The list portion tail pointers that mark the end of these list portions are respectively called the "donetail" pointer and the "curtail" pointer. The donelist accumulates callbacks that are ready to be invoked because their asynchronous grace period has completed. The curlist accumulates callbacks that will be ready to be invoked when the current asynchronous grace period ends. The TINY_PREEMPT_RCU variant maintains three list portions, namely, the donelist and curlist described above, and an additional list portion known as the "nextlist." The nextlist follows the curlist. The list portion tail pointer that marks the end of the nextlist is called the "nexttail" pointer. The nextlist is used to handle callbacks that are registered while there are blocked readers preventing the end of an asynchronous grace period. The TREE_RCU and TREE_RCU_PREEMPT variants maintain four list portions, namely, the donelist, curlist and nextlist described above, and an additional list portion known as the "nextreadylist." The nextreadylist is between the curlist and the nextlist. The list portion tail pointer that marks the end of the nextreadylist is called the nextreadytail pointer. The nextreadylist is needed because hierarchical RCU implementations must handle that fact different processors will note quiescent states and grace periods at different times. The nextreadylist is used to accumulate callbacks that are known to have arrived on the callback list 32 before the end of the current asynchronous grace period. It differs from the nextlist in that the latter is used to accumulate callbacks that might have arrived after the current grace period ended.

Turning now to FIGS. 8A-8C, the RCU grace period detection/callback processing information 34 maintained by the RCU subsystem 20 varies by RCU implementation. FIG. 8A illustrates the grace period detection/callback processing information 34 used in a TINY_RCU implementation. This information comprises an rcu_ctrlblk structure 34A that contains a set of callback list pointers 34A-1, namely, the list head pointer, the donetail pointer and the curtail pointer described above in connection with FIG. 7.

FIG. 8B illustrates the grace period detection/callback processing information 34 used in a TINY_PREEMPT_RCU implementation. As shown, this information comprises the same rcu_ctrlblk structure 34A of FIG. 8A. In addition, there is an rcu_preempt_ctrlblk structure 34B. This data structure contains a single callback list pointer 34B-1, which is the nexttail pointer described above in connection with FIG. 7. The rcu_ctrlblk structure 34B also contains a set of grace period/quiescent state counters 34B-2 that identify the current grace period, the last quiescent state seen by the processor, and the last grace period that the processor completed. The rcu_ctrlblk structure 34B further contains a set of blocked task tracking information 34B-3 for tracking reader tasks that were preempted inside their RCU read-side critical sections. These readers may be blocking an asynchronous grace period or a synchronous expedited grace period, or may be in need of priority boosting. The blocked task tracking information 34B-3 comprises a blocked task list head pointer that references the head of a blocked tasks list, and various list pointers that reference blocked tasks that are respectively affecting asynchronous grace periods, expedited grace periods, or which require priority boosting.

FIG. 8C illustrates the grace period detection/callback processing information 34 used in TREE_RCU and TREE_PREEMPT_RCU implementations. As shown, this information comprises a set of rcu_data structures 34C, a set of rcu_node structures 34D, and a global rcu_state structure 34E. The rcu_data structures 34C are provided on a per-processor basis. Each such structure contains a set of callback list pointers 34C-1 and a set of grace period/quiescent state counters and flags 34C-2. The callback list pointers 34C-1 include all of the list pointers described above in connection with FIG. 7, namely, the list head pointer, the donetail pointer, the curtail pointer, the nextreadytail pointer and the nexttail pointer. The grace period/quiescent state counters and flags identity such information as the last grace period completed by the processor, the highest grace period number that the processor is aware of having started, the last quiescent state completed by the processor, whether or not the processor has passed through a quiescent state during the current grace period, whether a quiescent state is needed from the processor, and other information.

The rcu_node structure 34D are arranged in a tree hierarchy that is embedded in a linear array in the rcu_state structure 34E. The rcu_node hierarchy comprises one or more leaf rcu_node structures, zero or more levels of internal rcu_node structures, and a top-level root rcu_node structure (if there is more than one leaf rcu_node structure). Each leaf rcu_node structure 34D is assigned to some number of rcu_data structures 34C. Each internal rcu_node structure 34D is then assigned to some number of lower level rcu_node structures, and so on until the root rcu_node structure is reached. The number of rcu_node structures 34D depends on the number of processors in the system. Very small multiprocessor systems may require only a single rcu_node structure 34D whereas very large systems may require numerous rcu_node structures arranged in a multi-level hierarchy.

Each rcu_node structure comprises a set of grace period/quiescent state counters and flags 34D-1, and a set of blocked task tracking information 34D-2. The grace period/quiescent state counters and flags 34D-1 track grace period and quiescent state information at the node level. The blocked task tracking information 34D-2 is used by the TREE-PREEMPT_RCU implementation to track reader tasks that were preempted inside their RCU read-side critical sections. The rcu_state structure 34E also contains a set of a set of grace period/quiescent state counters and flags 34E-1 that track grace period and quiescent state information at a global level.

Figure 9:
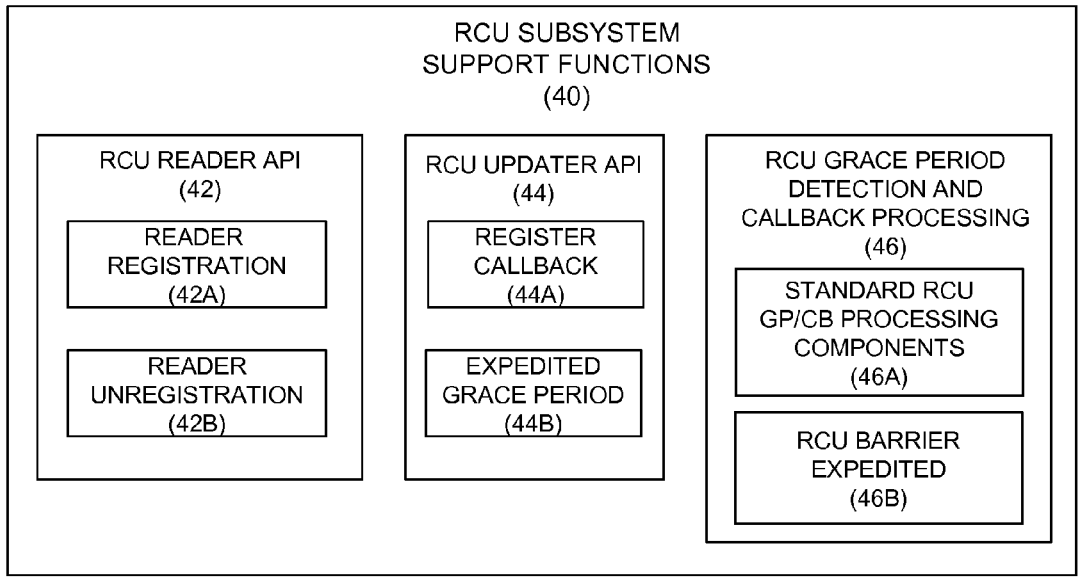
FIG. 9 is a functional block diagram showing additional functional components of the RCU subsystem of FIG. 6.

Turning now to FIG. 9, the RCU reader API 42 within the RCU subsystem 20 comprises a reader registration component 42A and a reader unregistration component 42B. These components are respectively invoked by readers 21 as they enter and leave their RCU read-side critical sections. This allows the RCU subsystem 20 to track reader quiescent states, with all processing performed outside of a set of bounded calls to the reader registration and unregistration components being treated as a quiescent state for a given reader. The reader registration component 42A and the reader unregistration component 42B may be respectively implemented using the conventional "rcu_read_lock( )" and "rcu_read_unlock"

primitives found in existing RCU implementations. As is known, these primitives differ depending on the RCU variant being used, with the preemptible RCU variants TINY_PREEMPT_RCU and TREE_PREEMPT_RCU implementing operations in the rcu_read_unlock primitive to handle readers that were preempted while in their RCU read-side critical sections.

As further shown in FIG. 9, the RCU updater API 44 comprises a register callback component 44A that is associated with asynchronous grace periods and an expedited grace period component 44B that is associated with synchronous grace periods. The register callback component 44A is invoked by updaters 18 in order to register a callback following a first-phase update to a shared data element 16. It may be implemented using the conventional "call_rcu( )" primitive found in existing RCU implementations. Invocation of the register callback component 44A of the RCU updater API 44 initiates processing that places an RCU callback 32A on the RCU callback list 32 of the processor 4 that runs the updater 21. In some RCU variants, the register callback component 44A may also starts an asynchronous grace period (if one is not already in progress) (see TINY_PREEMPT_RCU) or may force a quiescent state if one is needed (see TREE_RCU AND TREE_PREEMPT_RCU).

Figure 1A:
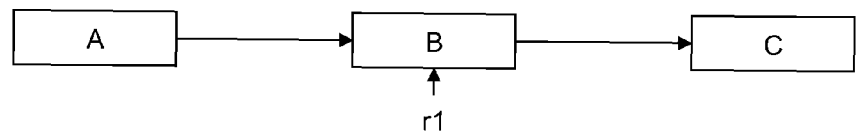
FIGS. 1A-1D are diagrammatic representations of a linked list of data elements undergoing a data element replacement according to a conventional read-copy update mechanism.
Figure 1B:
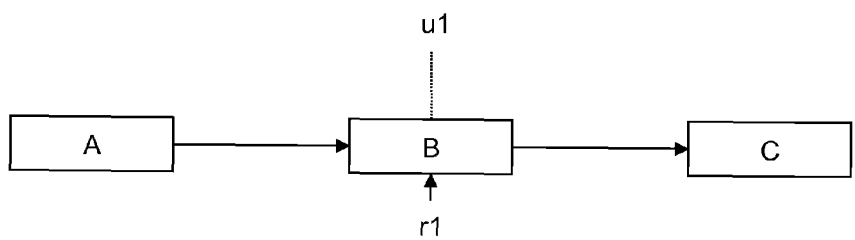
Figure 1C:
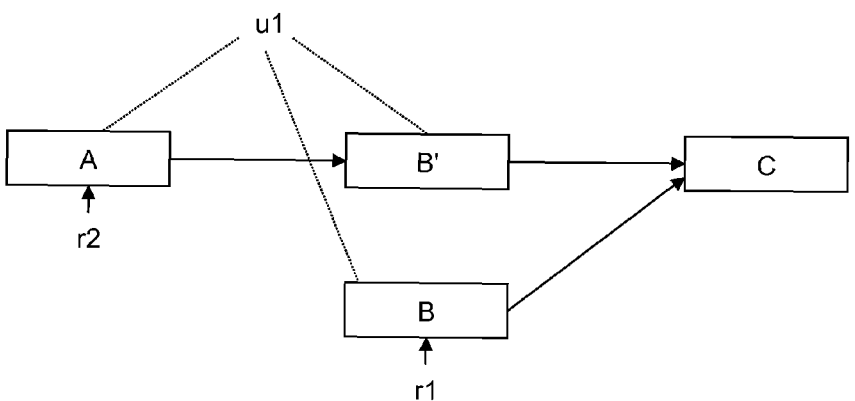
Figure 1D:
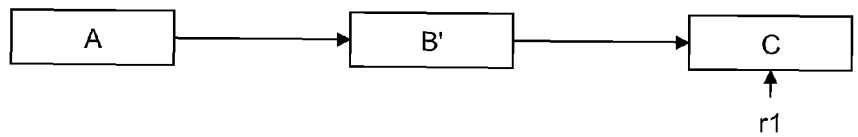
Figure 2A:
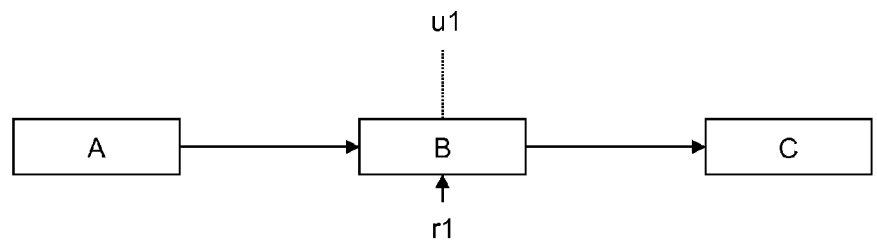
FIGS. 2A-2C are diagrammatic representations of a linked list of data elements undergoing a data element deletion according to a conventional read-copy update mechanism.
Figure 2B:
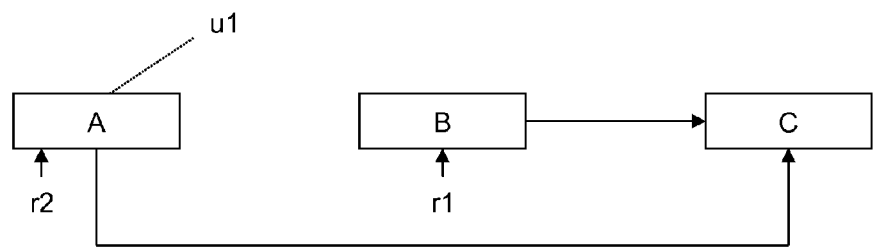
Figure 2C:
Figure 3:
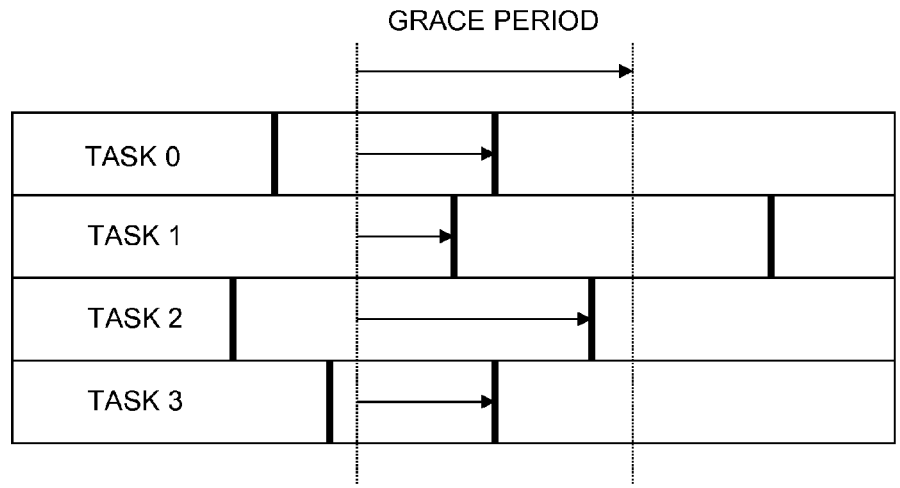
FIG. 3 is a flow diagram illustrating a grace period in which four processes pass through a quiescent state.

The expedited grace period component 44B of the RCU updater API 44 may be implemented using the synchronize_rcu_expedited( ) function found in each of the above-referenced RCU variants for implementing expedited synchronous grace periods. The expedited grace period component 44B is invoked by updaters 18 to request an expedited grace period following a first-phase update to a shared data element 16. The updater 18 blocks while the expedited grace period is in progress, then performs second-phase update processing to free stale data (or perform other actions). In the non-preemptible TINY_RCU and TREE_RCU implementations, the expedited grace period component 44B performs a scheduling action that forces the invoking processor to pass through a quiescent state. A scheduling action is also performed in TREE_PREEMPT_RCU to force all currently executing RCU readers 21 onto the blocked task list (see 34D-2 of FIG. 8C). In both TINY_PREEMPT_RCU and TREE_PREEMPT_RCU, the expedited grace period component 44B checks the blocked task list (see 34B-3 of FIGS. 8B and 34D-2 of FIG. 8C) for blocked readers 21. If there are any, the expedited grace period component 44B makes note of them (by setting a pointer), then waits for such readers to complete their RCU read-side critical sections so that the expedited grace period can end. If necessary, the synchronous expedited grace period component 44B will be aided by boosting the priority of one or more of the blocked readers 21. This will expedite reader completion of their RCU read-side critical sections and allow the synchronous expedited grace period to end more quickly.

The RCU grace period detection and callback processing functions 46 include a set of standard RCU grace period detection/callback processing components 46A, as well as a new component 46B, referred to as "RCU barrier expedited," that may be used for expediting the unloading of kernel modules that contain RCU callback processing code. The standard components 46A implement conventional RCU grace period detection and callback processing operations. The details of these operations will not be described herein insofar as they are well known to persons of ordinary skill in the art who are familiar with the RCU source code files identified in Table 1 above. The basic approach is to have the operating system task scheduler and timer tick (scheduling clock interrupt) functions drive the RCU subsystem state changes (by respectively initiating such processing via calls to the RCU functions "rcu_note_context_switch( )" and "rcu_check_callbacks( )"). Once invoked by the task scheduler or the scheduling clock interrupt handler, the grace period detection and callback processing operations performed by the standard components 46A differ between RCU implementations. In TINY_RCU, the standard components 46A implicitly note a quiescent state, check for pending callbacks and invoke deferred callback processing if any callbacks are found (using softirq context or a kernel thread). In TINY_PREEMPT_RCU, TREE_RCU and TREE_PREEMPT_RCU, the standard components 46A perform far more complex processing involving the data structures shown in FIGS. 8B and 8C to manipulate one or more grace period/quiescent state counters and flags that explicitly note quiescent states and grace periods, check for pending RCU callbacks on the callback list(s) 32 of FIG. 7, and invoke deferred callback processing when is permissible to do so. In the TINY_PREEMPT_RCU and TREE_PREEMPT_RCU variants, the standard components 46A also manage reader tasks that were preempted within their RCU read-side critical sections (using the blocked task lists referenced by the data structures 34B-3 of FIGS. 8B and 34D-2 of FIG. 8C, respectively), and may boost their priority if necessary in order to expedite grace periods. In the hierarchical TREE_RCU and TREE_PREEMPT_RCU variants, the standard components 46A must coordinate quiescent state and grace period tracking between multiple processors, which includes propagating quiescent state and grace period information up through the rcu_node hierarchy. All of the above-mentioned RCU variants are capable of handling processor low power states (dynticks idle). The hierarchical RCU variants are also capable of handling hot-plugging activity.

Turning now to the RCU barrier expedited component 46B, different versions thereof are provided for each of the above-referenced RCU variants. Each version may be implemented by modifying the existing RCU barrier primitive used for the corresponding RCU variant. The existing RCU barrier primitives are of two basic type, one type being used for the uniprocessor TINY_RCU and TINY_PREMPT_RCU variants, and the other type being used for the multiprocessor TREE_RCU and TREE_PREEMPT_RCU variants. The source code function names and file locations of these existing RCU barrier primitives are set forth in the "Background" section above.

Figure 10A:
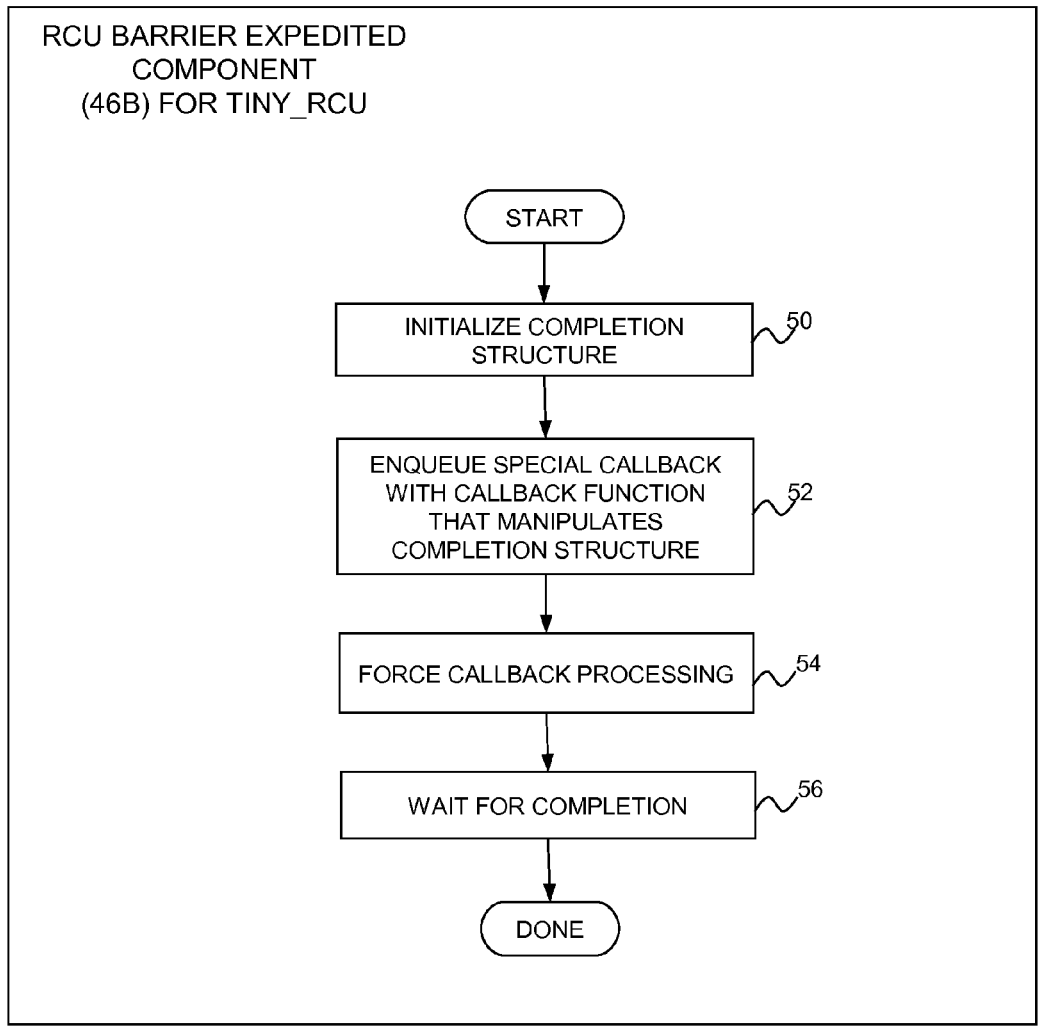
FIG. 10A is a flow diagram illustrating example operations that may be performed by the uniprocessor computing system of FIG. 4 in a TINY_RCU implementation of the RCU subsystem of FIG. 6.

Turning now to FIG. 10A, an example implementation of the RCU barrier expedited component 46B for use with TINY_RCU will now be described. For this implementation, which may be used with the uniprocessor system 2 of FIG. 4, a kernel module's exit code would take steps to stop updaters 18 from posting new callbacks (such as by stopping the kernel module's updater threads) before invoking the RCU barrier expedited component 46B. When the RCU barrier expedited component 46B is invoked, block 50 initializes a completion structure that is used to signal the RCU barrier expedited component when callback processing has ended. Block 52 then enqueues a special RCU callback 32A on the processor 4 by adding the callback to the end of the processor's RCU callback list 32 (see FIG. 7). When invoked, the special RCU callback 32A will implement a callback function that manipulates the completion structure initialized in block 50 so that a signal is sent to the RCU barrier expedited component 46B to advise that the special callback has been processed to completion.

Block 54 explicitly forces callback processing to be performed by the processor 4. For example, if RCU callbacks are processed in a deferred manner by a Linux® kernel thread (kthread), block 54 may implement the TINY_RCU function called "invoke_rcu_kthread( )" in order wake up the kthread. In block 56, the RCU barrier expedited component 46B sleeps until the special RCU callback 32A that was enqueued in block 52 is processed and signals the RCU barrier expedited component 46B to wake up. Insofar as the special RCU callback 32A represents the last callback on the processor's RCU callback list 32, the RCU barrier component 46B will return and the kernel module that invoked this component may be safely unloaded without leaving behind any unprocessed callbacks.

Blocks 50, 52 and 56 of FIG. 10A are implemented by current versions of TINY_RCU. Block 54 of FIG. 10A represents an expediting operation that is not currently present in TINY_RCU. This difference may be seen in Code Listing 1 below, which sets forth example C language code that may be used to define the RCU barrier expedited component 46B for TINY_RCU. Lines 2-7 and 9-12 represent statements that are found in the TINY_RCU rcu_barrier_sched( ) helper function defined at lines 298-309 of the Linux® version 3.1 source code file Linux/kernel/rcutiny.c. With the exception of lines 3, 4 and 11, which are used for debugging purposes, these statements embody the operations of blocks 50, 52 and 56 of FIG. 10A. The statement at line 8 represents the new operation added by block 54.

Code Listing 1

```
1   Void rcu_barrier_expedited(void)
2   {
3       struct rcu_synchronize rcu;
4       init_rcu_head_on_stack(&rcu.head);
5       init_completion(&rcu.completion);
6       /* Will wake me after RCU finished. */
7       call_rcu_sched(&rcu.head, wakeme_after_rcu);
8       rcu_sched_qs( );
9       /* Wait for it. */
10      wait_for_completion(&rcu.completion);
11      destroy_rcu_head_on_stack(&rcu.head);
12  }
```

Figure 10B:
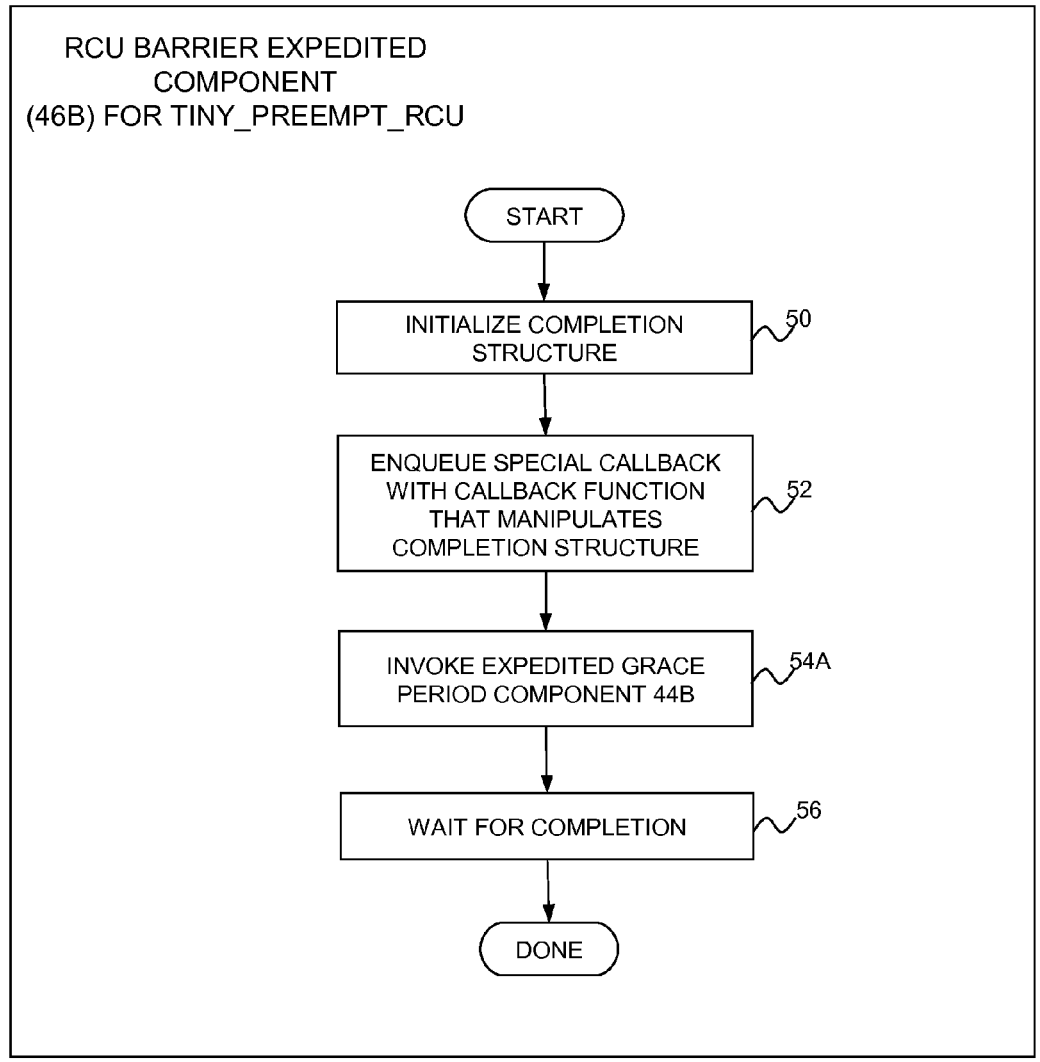
FIG. 10B is a flow diagram illustrating example operations that may be performed by the uniprocessor computing system of FIG. 4 in a TINY_PREEMPT_RCU implementation of the RCU subsystem of FIG. 6.

Turning now to FIG. 10B, an example implementation of the RCU barrier expedited component 46B for use with TINY_PREEMPT_RCU will now be described. This implementation is substantially similar to the TINY_RCU implementation of FIG. 10A, except that block 54 is replaced with block 54A, representing a different operation. Block 54B invokes the expedited grace period component 44B of FIG. 9. This component may be implemented by the rcu_synchronize_expedited( ) function set forth at lines 765-823 of the Linux® version 3.1 source code file Linux/kernel/rcutiny_plugin.h. When used in the RCU expedited barrier component 46B, the rcu_synchronize_expedited( ) function will cause any needed priority boosting to occur if there are readers 21 blocked within their RCU read-side critical sections. The presence of such blocked readers 21 will be indicated by the blocked task tracking information 34B-2 in the rcu_preempt_ctrlblk structure 34B of FIG. 8B. This will help expedite the end of a grace period so that the special RCU callback 32A enqueued in block 52 can be processed more quickly.

Blocks 50, 52 and 56 of FIG. 10B are implemented by current versions of TINY_PREEMPT_RCU. Block 54A of FIG. 10B represents an expediting operation that is not currently present in TINY_PREEMPT_RCU. These differences may be seen in Code Listing 2 below, which sets forth example C language code that may be used to define the RCU barrier expedited component 46B for TINY_PREEMPT_RCU. Lines 2-7 and 9-12 represent statements that are found in TINY_PREEMPT_RCU rcu_barrier( ) function defined at lines 700-711 of the Linux® version 3.1 source code file Linux/kernel/rcutiny_plugin.h. With the exception of lines 3, 4 and 11, which are used for debugging purposes, these statements embody the operations of blocks 50, 52 and 56 of FIG. 10B. The statement at line 8 represents the new operation added by block 54A.

Code Listing 2

```
1   Void rcu_barrier_expedited(void)
2   {
3       struct rcu_synchronize rcu;
4       init_rcu_head_on_stack(&rcu.head);
5       init_completion(&rcu.completion);
6       /* Will wake me after RCU finished. */
7       call_rcu(&rcu.head, wakeme_after_rcu);
8       synchronize_rcu_expedited( );
9       /* Wait for it. */
10      wait_for_completion(&rcu.completion);
11      destroy_rcu_head_on_stack(&rcu.head);
12  }
```

Figure 11A:
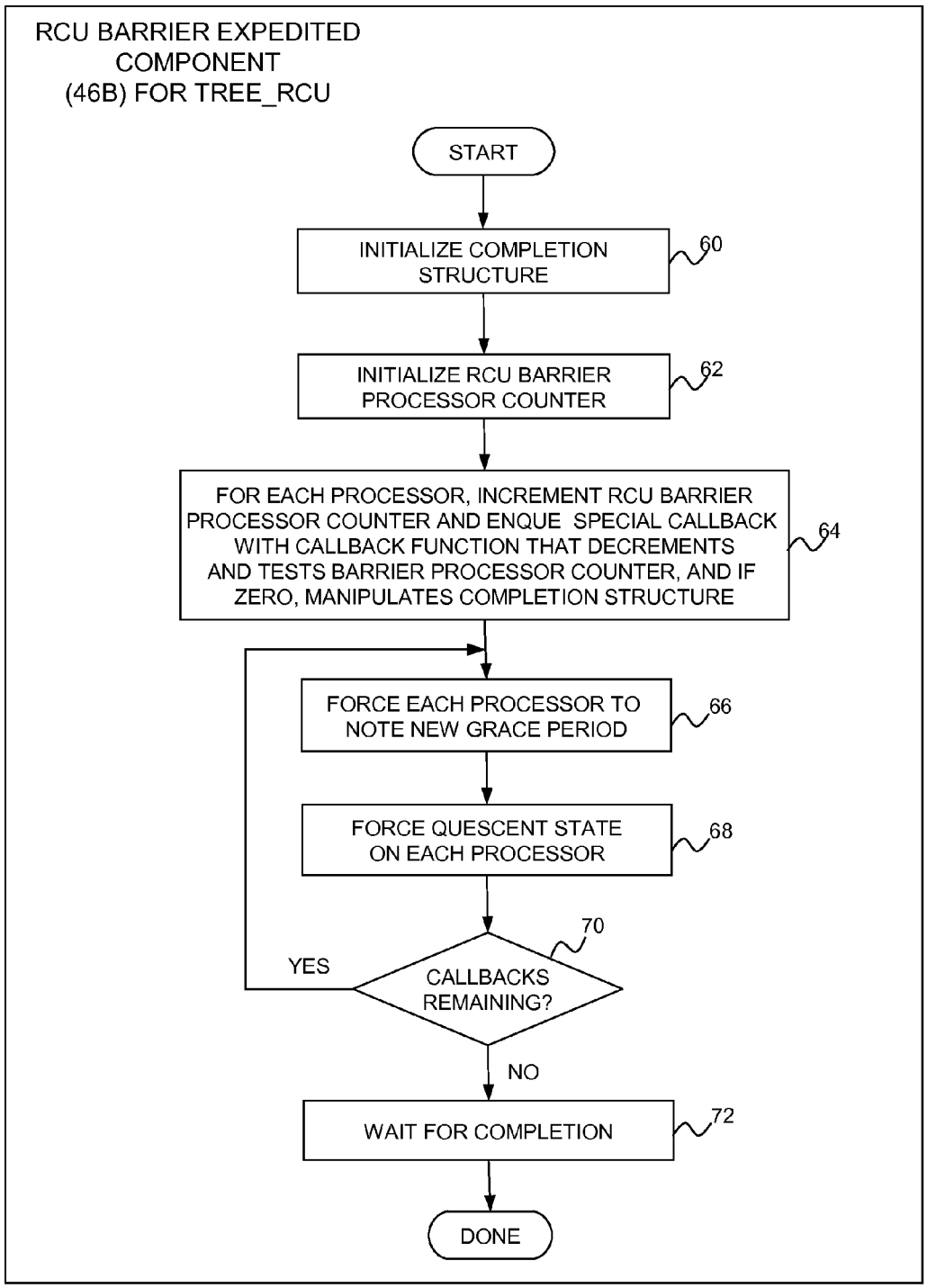
FIG. 11A is a flow diagram illustrating example operations that may be performed by the multiprocessor computing system of FIG. 5 in a TREE_RCU implementation of the RCU subsystem of FIG. 6.

Turning now to FIG. 11A, an example implementation of the RCU barrier expedited component 46B for use with TREE_RCU will now be described. For this implementation, which may used with the multiprocessor system 2A of FIG. 5, a kernel module's exit code would take steps to stop updaters 18 from posting new callbacks (such as by stopping the module's updater threads) before invoking the RCU barrier expedited component 46B. When the RCU barrier expedited component 46B is invoked, block 60 initializes a completion structure that is used to signal the RCU barrier expedited component when callback processing has ended. Block 62 initializes an RCU barrier processor counter that is used to track the invocation of a special RCU callback 32A on each of system 2A's multiple processors 4. Block 64 is then implemented to enqueue the special RCU callback 32A on each processor 4, while incrementing the RCU barrier processor counter as each special callback is posted. When invoked, the special RCU callback 32A will implement a callback function that decrements the RCU barrier processor counter and tests it for zero. The special RCU callback 32A that detects this condition will then manipulate the completion structure initialized in block 50 so that a signal is sent to the RCU barrier expedited component 46B to advise that the special RCU callback has been processed to completion.

Once the special RCU callbacks 34A are enqueued, blocks 66 and 68 are used to expedite callback invocation. Block 66 forces each processor 4 to take note a new grace period. This can be accomplished by calling the "invoke_rcu_core" function found at lines 1501-1504 of the Linux® version 3.1 source code file Linux/kernel/rcutree.c. This function wakes up the RCU kthread associated each processor 4, which in turn causes the processor to acknowledge the new grace period. Block 68 then forces a quiescent state on each processor 4. This may be accomplished by calling the TREE_RCU version of the force_quiescent_state( ) function found at lines 1424-1427 of the Linux® version 3.1 source code file Linux/kernel/rcutree.c. Invoking this function forces a rescheduling action on each processor 4.

Block 70 causes the operations of blocks 66 and 68 to be repeated until all of the special RCU callbacks 32A enqueued in block 64 have been invoked. This repetition is needed because each processor 4 in the multiprocessor system 2A might have an arbitrarily large number of pending RCU callbacks enqueued on the various portions of their callback lists 32 that are associated with different grace periods. Even though blocks 66 and 68 might forced the end of an existing grace period, it might take more than one invocation cycle to force the end of the old grace period, then begin a new grace period, then force each processor through a quiescent state, then report the quiescent state up the rcu_node hierarchy, and then actually process the callbacks. Eventually, the repeated cycling of blocks 66 and 68 will cause the completion structure that was initialized in block 60 to be reset, which will be detected in block 72. At this point, the kernel module that invoked the component RCU barrier expedited component 46B may be safely unloaded without leaving behind any unprocessed callbacks.

Blocks 60, 62, 64 and 72 of FIG. 11A are implemented by current versions of TREE_RCU. Blocks 66 and 68 of FIG. 11A represent expediting operations that are not currently present TREE_RCU. This difference may be seen in Code Listing 3 below, which sets forth example C language code that may be used to define the RCU barrier expedited component 46B for TREE_RCU. Lines 2-21 and 30-34 represent statements that are found in the TREE_RCU rcu_barrier( ) helper function defined at lines 1782-1807 of the Linux® version 3.1 source code file Linux/kernel/rcutree.c. With the exception of lines 4-7 and 33, which are used for mutex locking purposes, these statements embody the operations of blocks 60, 62, 64 and 72 of FIG. 11A. The statements at lines 22-29 represents the new operations added by blocks 66-70. In addition, lines 36-40 of Code Listing 3 set forth a new function called fqs_wrapper( ) that may be used for block 68. This function calls the existing force_quiescent_state function for TREE_RCU found at lines 1424-1427 of the Linux® version 3.1 source code file Linux/kernel/rcutree.c, which in turns calls the function "set_need_resched( ) that forces rescheduling on each processor 4.

Code Listing 3

```
1   static void_rcu_barrier_expedited(struct rcu_state *rsp,
2                     void (*call_rcu_func)(struct rcu_head *head,
3                     void (*func)(struct rcu_head *head)))
4   {
5       BUG_ON(in_interrupt( ));
6       /* Take mutex to serialize concurrent rcu_barrier( ) requests. */
7       mutex_lock(&rcu_barrier_mutex);
8       init_completion(&rcu_barrier_completion);
9       /*
10       * Initialize rcu_barrier_cpu_count to 1, then invoke
11       * rcu_barrier_func( ) on each CPU, so that each CPU also has
12       * incremented rcu_barrier_cpu_count. Only then is it safe to
13       * decrement rcu_barrier_cpu_count -- otherwise the first CPU
14       * might complete its grace period before all of the other CPUs
15       * did their increment, causing this function to return too
16       * early. Note that on_each_cpu( ) disables irqs, which prevents
17       * any CPUs from coming online or going offline until each
18       * online CPU has queued its RCU-barrier callback.
19       */
20      atomic_set(&rcu_barrier_cpu_count, 1);
21      on_each_cpu(rcu_barrier_func, (void *)call_rcu_func, 1);
22      while (callbacks remain) {
23          /*This requires that invoke_rcu_core( ) be modified to take a
24           * single parameter that it ignores. The invoke_rcu_core( )
25           * function replaces the older use of raise_softirq( ).
26           */
27          on_each_cpu(invoke_rcu_core, NULL, 1);
28          on_each_cpu(fqs_wrapper, rsp, 1);
29      }
30      if (atomic_dec_and_test(&rcu_barrier_cpu_count))
31          complete(&rcu_barrier_completion);
32      wait_for_completion(&rcu_barrier_completion);
33      mutex_unlock(&rcu_barrier_mutex);
34  }
35
36  void fqs_wrapper(void *rsp_in)
```

-continued

Code Listing 3

```
37  {
38      struct rcu_state *rsp = (struct rcu_state *)rsp_in;
39      force_quiescent_state(rsp, 0);
40  }
```

Figure 11B:
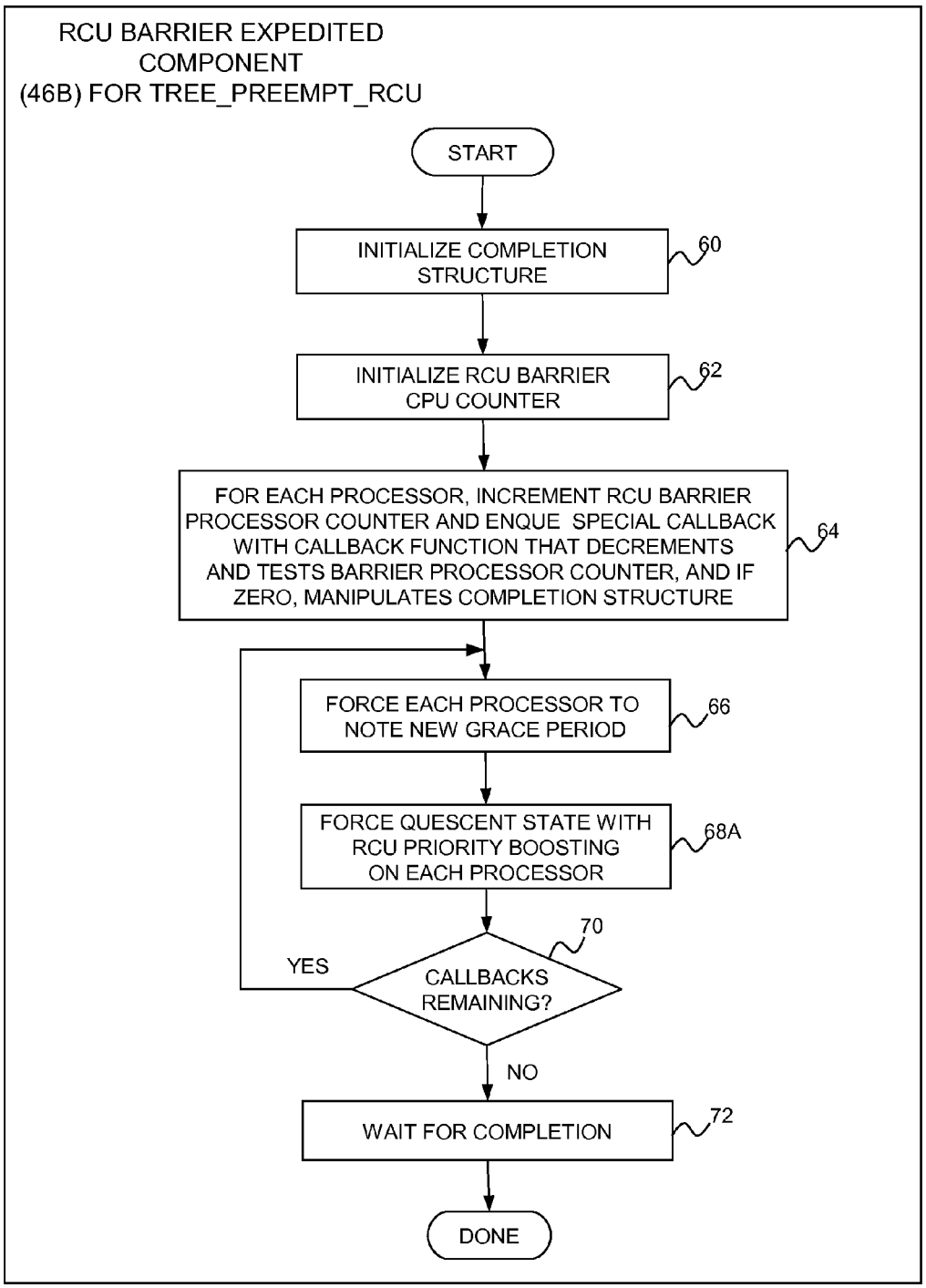
FIG. 11B is a flow diagram illustrating example operations that may be performed by the multiprocessor computing system of FIG. 5 in a TREE_PREEMPT_RCU implementation of the RCU subsystem of FIG. 6.

Turning now to FIG. 11B, an example implementation of the RCU barrier expedited component 46B for use with TREE_PREEMP_RCU will now be described. This implementation is substantially similar to the TREE_RCU implementation of FIG. 11A, except that block 68 is replaced with block 68A representing a modified force quiescent state operation that forces RCU priority boosting on blocked readers 21. Block 68A may be implemented by invoking the TREE_PREEMPT_RCU version of the force_quiescent_state( ) function set forth at lines 1358-1420 of the Linux® version 3.1 source code file Linux/kernel/rcutree.c. This function calls a function known as "force_qs_rnp( )" (see lines 1307-1352 of the Linux® version 3.1 source code file Linux/kernel/rcutree.c), which in turn calls an "rcu_initiate_boost( )" function found at lines 1259-1283 of the Linux® version 3.1 source code file Linux/kernel/rcutree_plugin.h. Note that Code Listing 3 for TREE_RCU is the same for TREE_PREEMPT_RCU, the only difference being the use of a different version of force_quiescent_state( ) to produce the above-mentioned priority boosting on processors 4 that have blocked readers 21.

Accordingly, a technique for has been disclosed for expeditiously unloading operating system kernel modules that implement RCU callback processing code. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIGS. 4-11B. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 12:
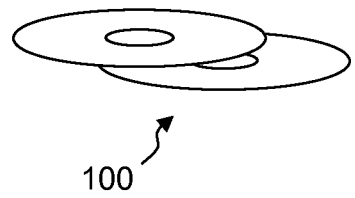
FIG. 12 is a diagrammatic illustration showing example media that may be used to provide a computer program product in accordance with the present disclosure.

Example data storage media for storing such program instructions are shown by reference numerals 8 (memory) and 10 (cache) of the uniprocessor system 2 of FIG. 4 and the multiprocessor system 2A of FIG. 5. The systems 2 and 2A may further include one or more secondary (or tertiary) storage devices (not shown) that could store the program instructions between system reboots. A further example of media that may be used to store the program instructions is shown by reference numeral 100 in FIG. 12. The media 100 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions either alone or in conjunction with an operating system or other software product that incorporates the required functionality. The data storage media could also be provided by portable magnetic storage media (such as floppy disks, flash memory sticks, etc.), or magnetic storage media combined with drive systems (e.g. disk drives). As is the case with the memory 8 and the cache 10 of FIGS. 4 and 5, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A system, comprising:
    one or more processors;
    a memory coupled to said one or more processors, said memory including a computer useable medium tangibly embodying at least one program of instructions executable by said processor to perform operations for expediting unloading of an operating system kernel module that executes read-copy update (RCU) callback processing code, said operations comprising:
    performing regular periodic grace period detection processing to detect the end of grace periods in which each of said one or more processors has passed through a quiescent state;
    wherein said expediting unloading of the operating system kernel module further comprising:
        enqueuing an RCU callback to be processed by said kernel module's callback processing code following completion of a grace period;
        performing an expediting operation that forces early completion of said grace period after it commences or expedites processing of said RCU callback when said grace period completes;
        processing said RCU callback;
        unloading said kernel module;
    wherein said system is one of a uniprocessor system that runs a non-preemptible operating system kernel, a multiprocessor system that runs a non-preemptible operating system kernel, or a multiprocessor that runs a preemptible operating system kernel;
    wherein if said system is a uniprocessor system that runs a non-preemptible operating system kernel, said callback processing code runs in a deferred non-process context of said operating system kernel, and said expediting operation comprises invoking said deferred non-process context to force said callback processing code to execute;
    wherein if said system is a multiprocessor system that runs a non-preemptible operating system kernel, and said expediting operation comprises forcing each processor to note a new grace period and forcing a quiescent state on each processor, said forcing a quiescent state including implementing a rescheduling operation on each processor, and wherein said expediting operation is repeated until said RCU callback is processed; and
    wherein if said system is a multiprocessor system that runs a preemptible operating system kernel, and said expediting operation comprises forcing each processor to note a new grace period and forcing a quiescent state on each processor, said forcing a quiescent state including implementing a priority boost for blocked reader tasks that are preventing completion of said grace period.

2. A system in accordance with claim 1, wherein said system is a multiprocessor system that runs a preemptible operating system kernel, and said expediting operation is repeated until said RCU callback is processed.

3. A computer program product, comprising:
    one or more non-transitory machine-useable storage media;
    program instructions provided by said one or more media for programming a data processing platform to perform operations for expediting unloading of an operating system kernel module that executes read-copy update (RCU) callback processing code, said operations comprising:
    performing regular periodic grace period detection processing to detect the end of grace periods in which each of said one or more processors has passed through a quiescent state;
    wherein said expediting unloading of the operating system kernel module further comprising:
        enqueuing an RCU callback to be processed by said kernel module's callback processing code following completion of a grace period;
        performing an expediting operation that forces early completion of said grace period after it commences or expedites processing of said RCU callback when said grace period completes;
        processing said RCU callback;
        unloading said kernel module;
    wherein said data processing platform is one of a uniprocessor system that runs a non-preemptible operating system kernel, a multiprocessor system that runs a non-preemptible operating system kernel, or a multiprocessor that runs a preemptible operating system kernel;
    wherein if said data processing platform is a uniprocessor system that runs a non-preemptible operating system kernel, said callback processing code runs in a deferred non-process context of said operating system kernel, and said expediting operation comprises invoking said deferred non-process context to force said callback processing code to execute;
    wherein if said data processing platform is a multiprocessor system that runs a non-preemptible operating system kernel, and said expediting operation comprises forcing each processor to note a new grace period and forcing a quiescent state on each processor, said forcing a quiescent state including implementing a rescheduling operation on each processor, and wherein said expediting operation is repeated until said RCU callback is processed; and wherein if said data processing platform is a multiprocessor system that runs a preemptible operating system kernel, and said expediting operation comprises forcing each processor to note a new grace period and forcing a quiescent state on each processor, said forcing a quiescent state including implementing a priority boost for blocked reader tasks that are preventing completion of said grace period.

4. A computer program product in accordance with claim 3, wherein said data processing platform is a multiprocessor system that runs a preemptible operating system kernel, and said expediting operation is repeated until said RCU callback is processed.

* * * * *